United States Patent
Pernleitner et al.

(10) Patent No.: US 11,753,950 B2
(45) Date of Patent: Sep. 12, 2023

(54) ROTOR BLADE WITH BLADE ROOT CONTOUR HAVING A STRAIGHT PORTION PROVIDED IN A CONCAVE CONTOUR PORTION

(71) Applicant: MTU AERO ENGINES AG, Munich (DE)

(72) Inventors: Martin Pernleitner, Munich (DE); Dieter Freno, Munich (DE); Klaus Wittig, Munich (DE); Christian Eichler, Munich (DE); Lutz Friedrich, Munich (DE); Johannes Linhard, Munich (DE)

(73) Assignee: MTU AERO ENGINES AG, Munich (DE)

( * ) Notice: Subject to any disclaimer, the term of this patent is extended or adjusted under 35 U.S.C. 154(b) by 0 days.

(21) Appl. No.: 17/613,507

(22) PCT Filed: May 18, 2020

(86) PCT No.: PCT/DE2020/000097
§ 371 (c)(1),
(2) Date: Nov. 23, 2021

(87) PCT Pub. No.: WO2020/239151
PCT Pub. Date: Dec. 3, 2020

(65) Prior Publication Data
US 2022/0251959 A1  Aug. 11, 2022

(30) Foreign Application Priority Data
May 24, 2019  (DE) .................. 10 2019 207 620.3

(51) Int. Cl.
*F01D 5/30*  (2006.01)

(52) U.S. Cl.
CPC ........ *F01D 5/3007* (2013.01); *F05D 2220/32* (2013.01); *F05D 2250/711* (2013.01); *F05D 2250/712* (2013.01)

(58) Field of Classification Search
None
See application file for complete search history.

(56) References Cited

U.S. PATENT DOCUMENTS 5,480,285 A * 1/1996 Patel ................. F01D 5/141
416/DIG. 5
7,794,208 B2  9/2010 Suzuki et al.
(Continued)

FOREIGN PATENT DOCUMENTS

CN  103649467 A *  3/2014  ........... F01D 5/3007
DE  102008002942 A1 *  1/2009  ........... F01D 5/3007
(Continued)

*Primary Examiner* — Michael Lebentritt
(74) *Attorney, Agent, or Firm* — LEYDIG, VOIT & MAYER, LTD.

(57) ABSTRACT

A gas turbine has a rotor blade. The rotor blade has a blade root connected to an airfoil. The blade root has a root contour with respect to a cross-sectional view. From a lower end of the blade root, the blade root contour has convex contour portions and concave contour portions. From the lower end along the blade root contour between a convex contour portion and an adjoining concave contour portion, there is a contour portion as a flank portion that is load-bearing. From the lower end along the blade root contour between a concave contour portion and an adjoining convex contour portion, there is a contour portion as a flank portion that is not load-bearing in operation. At least one of the concave contour portions has a first arc portion, a second arc portion, and a straight portion disposed between the two arc portions.

15 Claims, 2 Drawing Sheets

(56) References Cited

U.S. PATENT DOCUMENTS

| | | | |
|---|---|---|---|
| 7,905,709 | B2 | 3/2011 | Lagrange et al. |
| 2007/0237644 | A1 | 10/2007 | Suzuki et al. |
| 2009/0022591 | A1 | 1/2009 | Mujezinovic et al. |
| 2009/0257877 | A1 | 10/2009 | Alvanos et al. |
| 2016/0169011 | A1 | 6/2016 | Lana |
| 2017/0022819 | A1 * | 1/2017 | Weinert ............ F01D 5/3007 |

FOREIGN PATENT DOCUMENTS

| | | | |
|---|---|---|---|
| DE | 102008002942 A1 | 1/2009 | |
| EP | 3015652 A1 * | 5/2016 | ........... F01D 5/3007 |
| EP | 3336315 A1 | 6/2018 | |
| WO | WO 2017209752 A1 | 12/2017 | |

\* cited by examiner

ROTOR BLADE WITH BLADE ROOT CONTOUR HAVING A STRAIGHT PORTION PROVIDED IN A CONCAVE CONTOUR PORTION

CROSS REFERENCE TO RELATED APPLICATIONS

This application is a U.S. National Phase application under 35 U.S.C. § 371 of International Application No. PCT/DE2020/000097, filed on May 18, 2020, and claims benefit to German Patent Application No. DE 10 2019 207 620.3, filed on May 24, 2019. The International Application was published in German on Dec. 3, 2020 as WO/2020/239151 A1 under PCT Article 21(2).

FIELD

The present disclosure relates to a rotor blade for a gas turbine.

BACKGROUND

Rotor blades for a gas turbine are known in the art. A rotor blade may have a rotor blade root or blade root contour that is a "fir-tree contour." When such a rotor blade is in a mounted position in a rotor blade disk, the lower end of the blade root is located radially inwardly, and the contour portions adjoin each other from radially inward to radially outward. In this connection, the axis of symmetry corresponds to the radial direction.

In this disclosure, words such as "axial," "axially," "radial," "radially," and "circumferential" are taken with respect to the machine axis of the gas turbine, unless explicitly or implicitly indicated otherwise by the context.

During operation, high stresses occur in the blade root, particularly in the concave contour portions of blade roots with a fir-tree contour. Similarly, high stresses can also occur in the concave disk contour portions that are complementary to the convex contour portions of the associated rotor blades with fir-tree contours.

SUMMARY

In an embodiment, the present disclosure provides a rotor blade for a gas turbine. The rotor blade has: an airfoil portion; and a blade root connected to the airfoil portion. The blade root has a left and a right blade root contour with respect to a cross-sectional view. Proceeding from a lower end of the blade root, the blade root contour has at least two convex contour portions and at least two concave contour portions. Proceeding from the lower end along the blade root contour between a convex contour portion and an adjoining concave contour portion, there is provided a contour portion as a flank portion that is load-bearing in operation. Proceeding from the lower end along the blade root contour between a concave contour portion and an adjoining convex contour portion, there is provided a contour portion as a flank portion that is not load-bearing in operation. At least one of the concave contour portions has a first arc portion, a second arc portion, and a straight portion disposed between the two arc portions.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
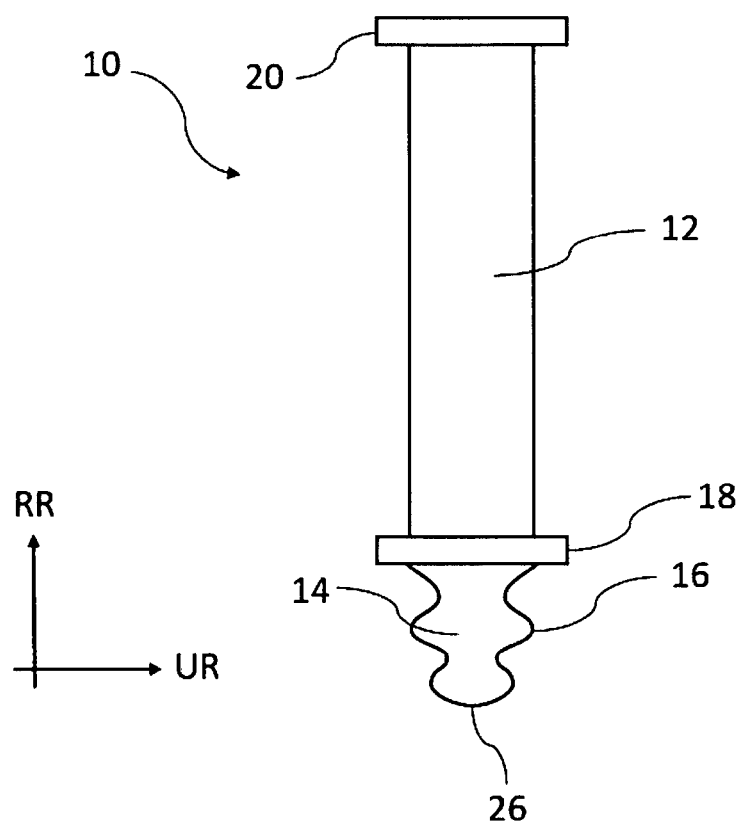
FIG. 1 is a simplified and schematic perspective view of a rotor blade with its rotor blade root.

The present disclosure relates to a rotor blade for a gas turbine, in particular an aircraft gas turbine, the rotor blade having an airfoil portion and a blade root connected to the airfoil portion, wherein the blade root has a left and a right blade root contour with respect to a cross-sectional view, wherein, proceeding from a lower end of the blade root, the blade root contour has at least two convex contour portions and at least two concave contour portions, wherein, proceeding from the lower end along the blade root contour between a convex contour portion and an adjoining concave contour portion, there is provided a contour portion as a flank portion that is load-bearing in operation, and wherein, proceeding from the lower end along the blade root contour between a concave contour portion and an adjoining convex contour portion, there is provided a contour portion as a flank portion that is not load-bearing in operation. The present disclosure relates to a rotor blade with a fir-tree countoured blade root.

An aspect of the present disclosure provides a rotor blade and a rotor blade disk that make it possible to reduce the stresses occurring during operation.

An aspect of the present disclosure provides a rotor blade for a gas turbine, in particular an aircraft gas turbine, the rotor blade having an airfoil portion and a blade root connected to the airfoil portion, wherein the blade root has a left and a right blade root contour with respect to a cross-sectional view, wherein, proceeding from a lower end of the blade root, the blade root contour has at least two convex contour portions and at least two concave contour portions, wherein, proceeding from the lower end along the blade root contour between a convex contour portion and an adjoining concave contour portion, there is provided a contour portion as a flank portion that is load-bearing in operation, and wherein, proceeding from the lower end along the blade root contour between a concave contour portion and an adjoining convex contour portion, there is provided a contour portion as a flank portion that is not load-bearing in operation. It is provided that at least one of the concave contour portions have a first arc portion, a second arc portion, and a straight portion disposed between the two arc portions.

The provision of such a straight portion between two concavely curved arc portions leads to a measurable reduction of the stresses occurring during operation. In particular, it could be found that the stress in the so-called notch root of the concave contour portion could be reduced by up to 10% as compared to a concave contour portion that is formed of only one arc portion or of a plurality of immediately adjacent arc portions having different radii.

The transition from the first arc portion and/or from the second arc portion to the straight portion may be a continuous-curvature transition or a continuous-tangent transition. This is particularly advantageous from a stress standpoint but relatively complex from a manufacturing standpoint when using conventional broaching techniques since special broaching tools must be produced. However, such transitions can be produced relatively easily by means of electro-chemical machining (ECM) and/or wire electro discharge machining (WEDM).

To allow the stresses to be optimally distributed, the first arc portion may have a larger first radius than the second arc portion. The first arc portion, the straight portion, and the second arc portion are disposed one behind the other along the blade root contour, proceeding from the lower end of the blade root.

The straight portion may have a radial length of up to about 20 millimeters, preferably 0.1 to 1 millimeters.

The non-load-bearing flank portion following the straight portion of the respective concave contour portion may be inclined, in particular at an angle of up to 30° with respect to a tangent to the circumferential direction, which tangent is orthogonal to the radial direction and to the axial direction. It should be borne in mind that for otherwise constant radii of the first and second arc portions, the inclination of the non-load-bearing flank portion is dependent on the length of the straight portion.

The straight portion may be provided in the first concave contour portion, proceeding from the lower end of the blade root. Accordingly, the stresses acting during operation are reduced in particular in the radially inner part of the blade root, which has the smallest extent in the circumferential direction because of the two symmetrically opposite concave contour portions.

An aspect of the present disclosure further provides a rotor blade disk, which in particular has a plurality of blade root slots in each of which may be received the blade root of a respective rotor blade as described above.

In accordance with an embodiment, the rotor blade disk has concave disk contour portions, each of which is complementary to a convex contour portion of a blade root contour of the associated rotor blade, which may be an inventive rotor blade or a different rotor blade, at least one of the concave disk contour portions having a first arc portion, a second arc portion, and a straight portion disposed between the two arc portions.

The transition from the disk's first arc portion and/or from the disk's second arc portion to the disk's straight portion may be a continuous-curvature transition or a continuous-tangent transition.

The disk's first arc portion may have a larger first radius than the disk's second arc portion. Additionally or alternatively, the disk's straight portion may have a radial length of up to about 20 millimeters, preferably 0.1 to 1 millimeters.

A flank portion of the blade root slot which flank portion is free during operation and the non-load-bearing flank portion of the blade root disposed radially above this free flank portion may form an angle of up to 20°. This angle is also influenceable by or dependent on the selection of the length of the straight portion.

An aspect of the present disclosure also provides a gas turbine, in particular an aircraft gas turbine, having such a rotor blade disk and a plurality of such rotor blades.

FIG. 1 shows in simplified, schematic, perspective view a rotor blade 10 for a gas turbine, in particular for an aircraft gas turbine or for an aircraft engine. Rotor blade 10 includes an airfoil portion 12. The term "airfoil portion 12" is used to refer to the part of the rotor blade that is exposed to a flow of fluid, in particular hot gas.

Rotor blade 10 has a blade root 14 located therebelow; i.e., radial inwardly. Blade root 14 has blade root contours 16 configured symmetrically with respect to a radial axis of symmetry on both sides of blade root 14 in the circumferential direction. As is typical, a radially inner shroud 18 is disposed between blade root 14 and airfoil portion 12. In addition, rotor blade 10 also includes a radially outer shroud 20.

Figure 2:
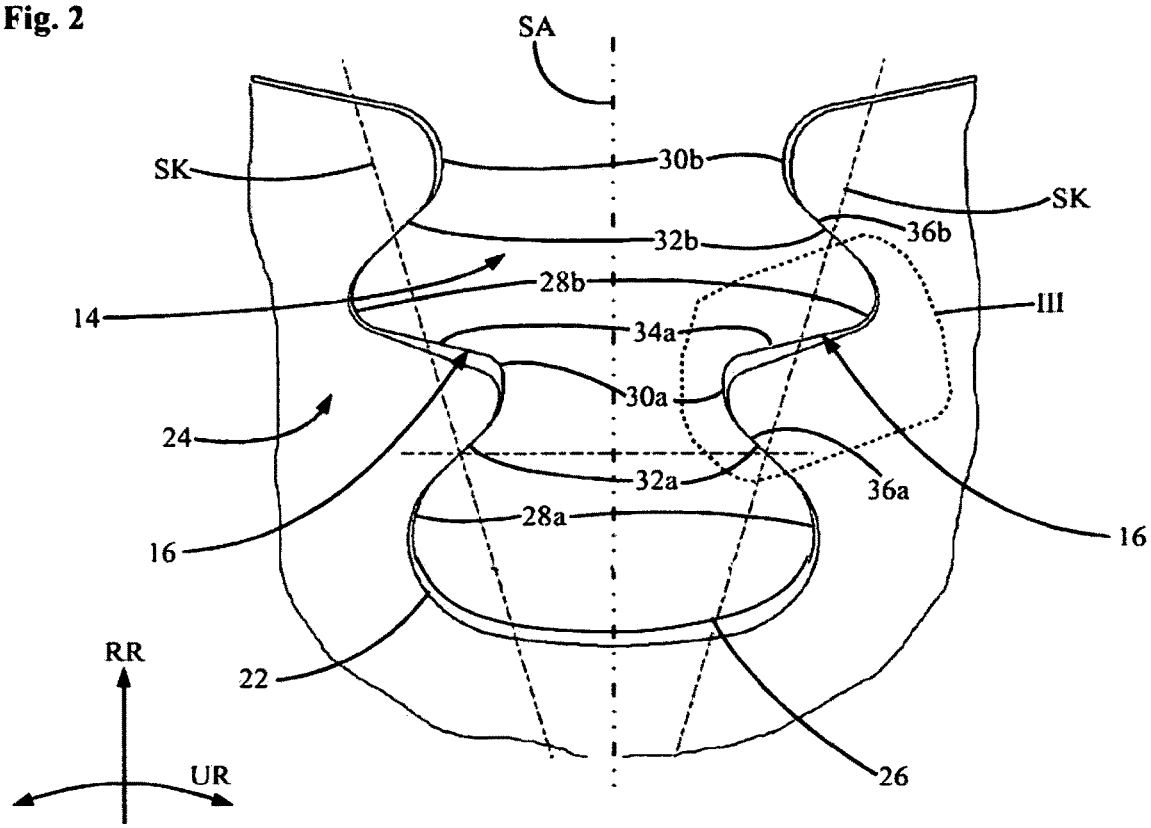
FIG. 2 is a simplified and schematic sectional view showing the blade root with its blade root contour received in a blade root slot of a rotor blade disk.

FIG. 2 shows blade root 14 with its blade root contour 16 in a simplified sectional view. In this view, blade root 14 is received in a blade root slot 22 of a merely schematically indicated rotor blade disk 24. FIG. 2 shows the axis of symmetry SA, which extends in radial direction RR. Blade root 14 has a left and a right blade root contour 16 on either side of the axis of symmetry SA. Blade root contour 16 extends radially outwardly from a lower or radially inner end 26 of blade root 14. Although in this example, blade root 14 has symmetrical blade root contours 16, this is not a mandatory limitation. The left blade root contour and the right blade root contour may also be non-symmetrical to each other, for example because of different radii of the convex/concave flank portions.

Figure 3:
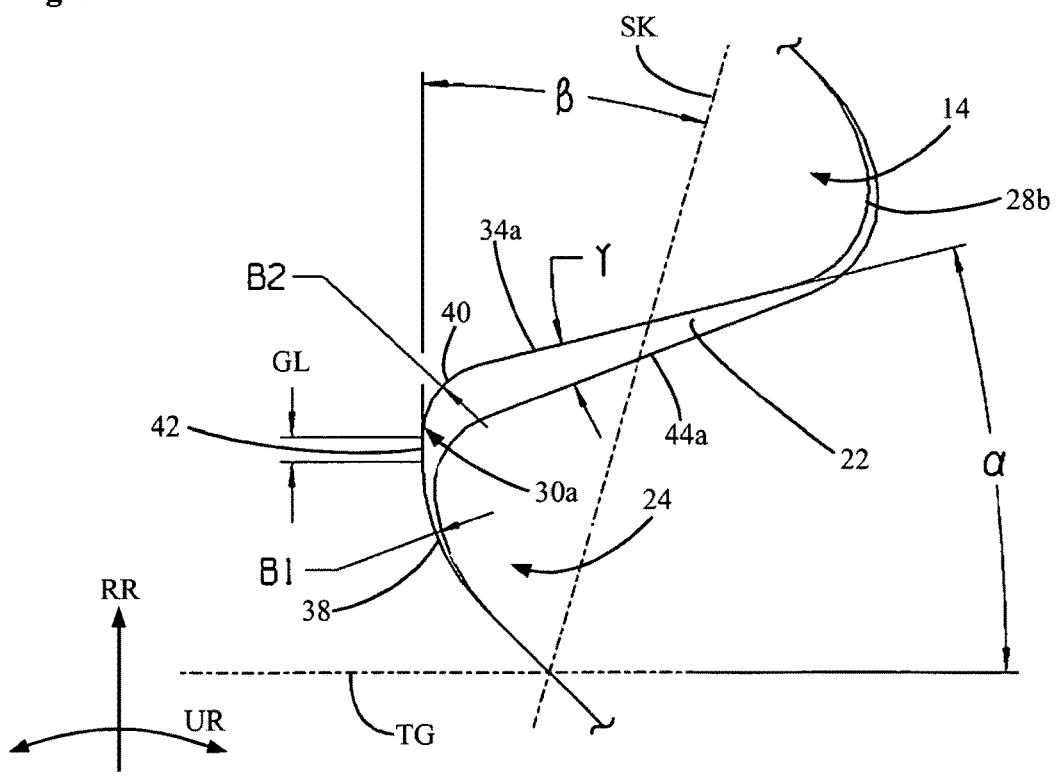
FIG. 3 is an enlarged view of the portion III surrounded by a broken line in FIG. 2.

Blade root contour 16 includes two convex contour portions 28a, 28b and two concave contour portions 30a, 30b. Formed between convex contour portion 28a and concave contour portion 30a is a load-bearing flank portion 32a, here formed as, for example, a straight portion. Another load-bearing flank portion 32b is formed between convex contour portion 28b and concave contour portion 30b. Formed between concave contour portion 30a and convex contour portion 28b is a non-load-bearing flank portion 34a. The terms "load-bearing" and "non-load-bearing" refer to the case where a gas turbine is in operation. During operation of the gas turbine, rotor blade 10 and rotor blade root 14 are moved radially outwardly by the action of centrifugal forces. Accordingly, load-bearing flank portions 32a, 32b come into contact with corresponding load-bearing mating portions 36a, 36b formed in blade root slot 22 of rotor blade disc 24. This operating condition is shown in FIGS. 2 and 3.

In order to reduce the stresses acting on the blade root during operation, the concave contour portion 30a has a first arc portion 38 and a second arc portion 40. A straight portion 42 is formed between the two arc portions 38, 40. Straight portion 42 has a length denoted by GL in FIG. 3. This length GL is in particular up to 20 millimeters, preferably 0.1 to 1 millimeters. First arc portion 38 has a radius B1, and second arc portion 40 has a radius B2. Radius B1 is greater than radius B2. Straight portion 42 connects the two arc portions 38, 40 substantially parallel to radial direction RR.

Non-load-bearing flank portion 34a is inclined and forms an angle α of up to 30° with a tangent TG to circumferential direction UR. Furthermore, an angle γ of up to 20° is formed between non-load-bearing flank portion 34a and a non-load-bearing mating portion 44a of blade root slot 22. An angle β formed between a so-called skeleton line SK and straight portion 42 is about 0° to 20°, preferably about 12° to 18°.

Length GL of straight portion 42 may in particular be selected such that the above-mentioned angles do not become greater than the above-mentioned values. The angle may range from 0° to 30°. Thus, length GL of straight portion 42 has an influence on the inclination of non-load-bearing flank portion 34a. In particular, the inclination or angle becomes smaller when a longer length GL is chosen.

The provision of straight portions 42 makes it possible to reduce stresses, in particular in a radially inner region of blade root 14, where blade root 14 has a minimum extent in circumferential direction UR between concave contour portions 28a. This makes it possible to better counteract wear and/or material fatigue in this radially inner region of blade root 14.

The present invention also includes a rotor blade disk which, similarly to the inventive rotor blade, has a straight portion which is capable of reducing stresses, but which, however, is not described in detail with reference to the drawings.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS 10 rotor blade
12 airfoil portion
14 blade root
16 blade root contour
18 inner shroud
20 outer shroud
22 blade root slot
24 rotor blade disk
26 lower end
28a,b convex contour portion
30a,b concave contour portion
32a,b load-bearing flank portion
34 anon-load-bearing flank portion
36a,b load-bearing mating portion
38 first arc portion
40 second arc portion
42 straight portion
44a,b non-load-bearing mating portion
AR axial direction
GL length of the straight portion
RR radial direction
SA axis of symmetry
SK skeleton line
TG tangent
UR circumferential direction

The invention claimed is:

1. A rotor blade for a gas turbine, the rotor blade comprising:
an airfoil portion; and
a blade root connected to the airfoil portion,
wherein the blade root has a left and a right blade root contour with respect to a cross-sectional view,
wherein, proceeding from a lower end of the blade root, the blade root contour has at least two convex contour portions and at least two concave contour portions,
wherein, proceeding from the lower end along the blade root contour between a convex contour portion and an adjoining concave contour portion, there is provided a contour portion as a flank portion that is load-bearing in operation, and
wherein, proceeding from the lower end along the blade root contour between a concave contour portion and an adjoining convex contour portion, there is provided a contour portion as a flank portion that is not load-bearing in operation,
wherein at least one of the concave contour portions has a first arc portion, a second arc portion, and a straight portion disposed between the two arc portions, and
wherein the first arc portion has a larger first radius than the second arc portion.

2. The rotor blade as recited in claim 1,
wherein the transition from the first arc portion or from the second arc portion to the straight portion is a continuous-curvature transition or a continuous-tangent transition.

3. The rotor blade as recited in claim 1,
wherein the straight portion has a radial length of up to about 20 millimeters.

4. The rotor blade as recited in claim 1,
wherein the non-load-bearing flank portion following the straight portion of the respective concave contour portion is inclined with respect to a tangent to the circumferential direction, the tangent being orthogonal to the radial direction and to the axial direction.

5. The rotor blade as recited in claim 1,
wherein proceeding from the lower end of the blade root, the straight portion is provided in the first concave contour portion.

6. A rotor blade disk for receiving the rotor blade according to claim 1, the rotor blade disk comprising:
concave disk contour portions, each of which is complementary to the convex contour portion of the blade root contour of the rotor blade,
wherein at least one of the concave disk contour portions has a first arc portion, a second arc portion, and a straight portion disposed between the two arc portions, the transition from the rotor blade disk's first arc portion or from the rotor blade disk's second arc portion to the rotor blade disk's straight portion being a continuous-curvature transition or a continuous-tangent transition, or the rotor blade disk's first arc portion having a larger first radius than the rotor blade disk's second arc portion, or the rotor blade disk's straight portion having a radial length of up to about 20 millimeters.

7. The rotor blade disk as recited in claim 6, having a plurality of blade root slots in each of which is received the blade root of a respective one of a plurality of rotor blades, comprising the rotor blade.

8. The rotor blade disk as recited in claim 6
wherein the flank portion of the blade root slot that is free during operation and the non-load-bearing flank portion of the blade root disposed radially above the free flank portion form an angle of up to 20°.

9. The aircraft gas turbine, comprising the rotor blade disk as recited in claim 7.

10. The rotor blade as recited in claim 1, wherein the straight portion has a radial length of 0.1 to 1 millimeters.

11. The rotor blade as recited in claim 4, wherein the non-load-bearing flank portion following the straight portion of the respective concave contour portion is inclined at an angle of up to 30° with respect to the tangent to the circumferential direction.

12. The rotor blade disk according to claim 6, the disk's straight portion has the radial length 0.1 to 1 millimeters.

13. The rotor blade as recited in claim 1, wherein the straight portion is parallel to a radial direction of the gas turbine.

14. The aircraft gas turbine as recited in claim 9,
wherein the rotor blade disk has a blade root slot defined by a disk contour comprising the concave disk contour portions and convex disk contour portions, the convex disk contour portions being complementary to the concave contour portions of the blade root of the rotor blade,
wherein the blade root of the rotor blade is arranged in the blade root slot of the rotor blade disk,
wherein the disk contour comprises load-bearing mating portions that are configured to contact the contour portion of the blade root that is provided as the flank portion that is load bearing during operation of the aircraft gas turbine, and
wherein the disk contour comprises non-load-bearing portions that are configured not to contact the contour portion of the blade root that is provided as the flank portion that is not load bearing during operation of the aircraft gas turbine.

15. A rotor blade for a gas turbine, the rotor blade comprising:
an airfoil portion; and
a blade root connected to the airfoil portion,
wherein the blade root has a left and a right blade root contour with respect to a cross-sectional view,
wherein, proceeding from a lower end of the blade root, the blade root contour has at least two convex contour portions and at least two concave contour portions,
wherein, proceeding from the lower end along the blade root contour between a convex contour portion and an adjoining concave contour portion, there is provided a contour portion as a flank portion that is load-bearing in operation, and
wherein, proceeding from the lower end along the blade root contour between a concave contour portion and an adjoining convex contour portion, there is provided a contour portion as a flank portion that is not load-bearing in operation,
wherein at least one of the concave contour portions has a first arc portion, a second arc portion, and a straight portion disposed between the two arc portions, and
wherein the non-load-bearing flank portion following the straight portion of the respective concave contour portion is inclined with respect to a tangent to the circumferential direction, the tangent being orthogonal to the radial direction and to the axial direction,
wherein a length of the straight portion is selected such that:
the non-load-bearing flank portion following the straight portion of the respective concave contour portion is inclined at a first angle of no more than 30° with respect to the tangent to the circumferential direction,
a second angle formed between a skeleton line and the straight portion of the respective contour portion does not exceed 20°, and
a third angle does not exceed 20°, the third angle being between the non-load-bearing flank portion following the straight portion of the respective concave contour portion and a corresponding non-load-bearing mating portion of a disk contour defining a disk slot of a rotor blade disk, the third angle being configured to be formed in a state where the rotor blade is received in the rotor blade disk.

* * * * *